Jan. 23, 1951

R. M. STRACHAN 2,539,283

OSCILLATORY METERING CHAMBER DISPENSER
FOR SMALL CONTAINERS
Filed Feb. 13, 1945

Inventor
ROBERT M. STRACHAN

By *Clarence A. O'Brien
and Harvey B. Jackson*
Attorneys

UNITED STATES PATENT OFFICE 2,539,283

OSCILLATORY METERING CHAMBER DISPENSER FOR SMALL CONTAINERS

Robert M. Strachan, Cranberry Lake, British Columbia, Canada

Application February 13, 1945, Serial No. 577,673

1 Claim. (Cl. 222—363)

This invention relates to improvements in dispensers and has for its object to provide a dispenser for delivering a measured quantity of powdered or granular material.

Another object of the invention is to provide a container for tooth powder or the like upon which is attached a measuring dispenser.

A further object of the invention is to provide a scoop shaped cylinder having a pair of arcuately formed closure members between which is a measuring pocket.

Other features and advantages will become more readily apparent from the following description and the accompanying illustrative drawings in which.

Figure 1:
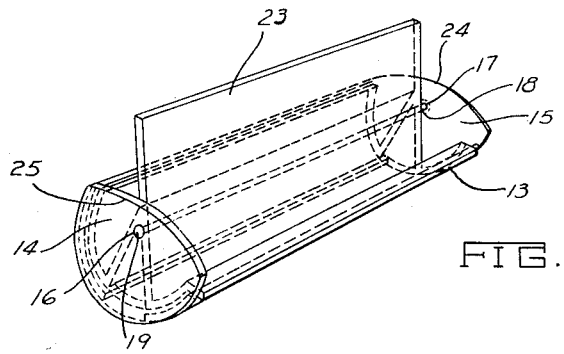
Figure 1 is a perspective view of my device.
Figure 2:
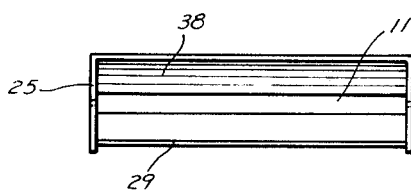
Figure 2 is a top plan view of one member of the device.
Figure 3:
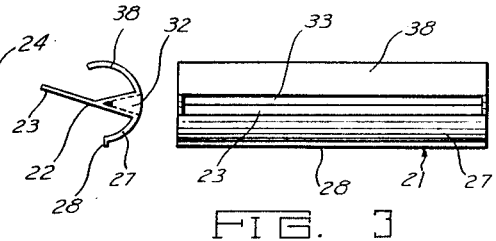
Figure 3 is a similar view of another member thereof.
Figure 4:
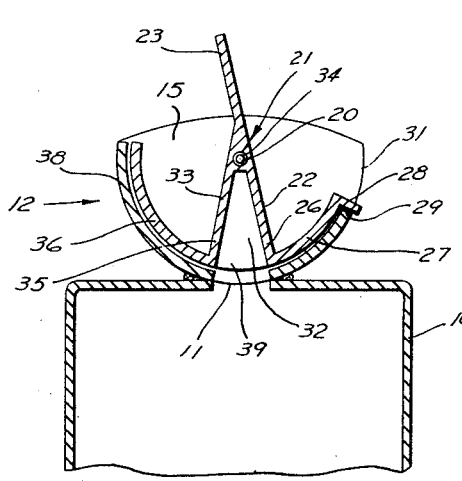
Figure 4 is an enlarged transverse section of the device shown attached to a can.

In the accompanying drawings as above enumerated and in the following specification, like characters of reference indicate like parts throughout and in which 10 indicates a dispensing can having an outlet 11 therein directly above which is mounted by measuring dispenser 12, which is secured to the can by soldering or in any other suitable manner. The member 12 consists of a semi-cylindrical member 13 having end walls 14 and 15 provided with apertures 16 and 17, for supporting the terminals 18 and 19 of a shaft 20, carried by a pivoted measuring and dispensing member 21. This member comprises a plate 22, the upper end 23 of which projects above the edges 24 and 25 of the walls 14 and 15 and forms a lever whereby the member 21 may be manipulated. To the lower end 26 of the member 22 is integrally attached an arcuate segmental extension 27 having a right angular flange 28 adapted to engage the edge 29 of the member 13, the wall 30 of said member 13 being reduced in length in order to provide an outlet 31 for material which has been deposited in the pocket 32, formed between the wall of the member 22, and the wall 33 connected to the wall 22, at approximately the pivot point 34 of the member 22, said wall 33, being inclined away from the wall 22, in order to provide said pocket 32, which pocket normally seats by gravity directly over the outlet 11, of member 10. The terminal 37, of member 35 carries a member 36 which is a segment of a cylinder and is adapted to comprise a stopper for the outlet 11 when the dispensing member 21 is in one position. The member 36 has approximately the same length and width as the segment 38 of member 12. From the above description it will be obvious that as the center of gravity of the member 21 is substantially directly below the pivot 20 when the member 21 is positioned as shown in Figure 4, said member 21, will maintain itself in a position to normally keep the pocket 32, in position to receive a load from the container 10. The space 32, is such as to hold a desired quantity of the contents of the can 10, when the latter is held in upside down position.

Figure 5:
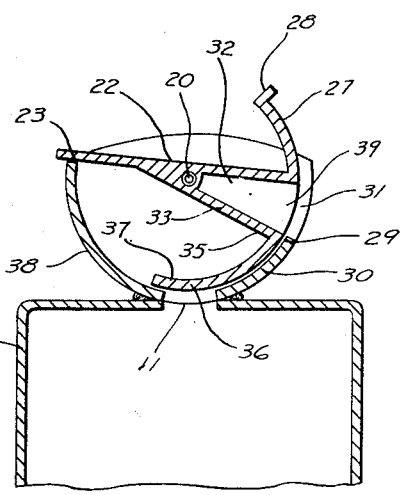
Figure 5 is a similar view, one of the parts being shown in changed position.

An intelligent reading of the above description will clearly indicate how the member 21 may be manipulated to allow the metered loading of material into the pocket 32 and subsequent unloading of this metered quantity of material through the opening 31, the member 21 being moved in relation to the can either directly by the finger or by tilting the can. It will also be clear how the segment 36 will close the outlet 11 while the material is being dispensed through the opening 31. The normal position of the member 21 when the can is upright is illustrated in Figure 4. The discharging position of this member is illustrated in Figure 5. The operator's finger may be used to hold the member in either of these positions relative to the can, or the can may be tilted to move the member 21 into either of these positions relative to the can, since the center of gravity of the member 21 is not at the pivot 20. To operate the device without applying the finger to the member 21, the can is tilted counter-clockwise from the vertical position shown in Figure 4 until the material from the can fills the pocket 32. With the can still maintained in inverted or semi-inverted position, the can may now be rotated about the longitudinal axis thereof and the member 21 will rotate on the axis 20 to allow the discharge of the metered quantity of material through the opening 31 onto a toothbrush or the like held below the opening 31.

In the procedure described immediately above, the device is tilted counterclockwise from the position indicated in Figure 4 because of the flange 28.

While the above device may be used for dispensing any powdered or granular material I have demonstrated it in the accompanying drawings as a dispenser of tooth powder and in this case the pocket 32 is of a suitable dimension to hold a desired quantity of tooth powder to be deposited upon a toothbrush the member 22 being approximately the length of the brush.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

A metering and dispensing device secured to a container having an outlet, comprising a semi-cylindrical member having an opening and secured to the container so that said outlet registers with said opening, opposing end walls on said member, a measuring member comprising a pair of diverging similar plates connected together and cooperating with said end walls to provide a pocket, said plates being mounted on and between said end walls coaxially of the semi-cylindrical member for oscillatory movement, arcuate plate members extending outwardly from the edges of the diverging plates adjacent the semi-cylindrical member and adapted to fit closely within said semi-cylindrical member, a flange on the outer edge of one of said arcuate plate members to engage an outer edge of the semi-cylindrical member when the measuring member is in pocket loading position to assure proper registration of the pocket with said opening, and a lever comprising an extension of one of said diverging plates and dimensioned to engage the opposite edge of the semi-cylindrical member when the measuring member is shifted into a discharging position with the mouth of the pocket disposed beyond the first mentioned edge of the semi-cylindrical member.

ROBERT M. STRACHAN.

REFERENCES CITED

The following references are of record in the file of this patent:

UNITED STATES PATENTS

| Number | Name | Date |
|---|---|---|
| 352,925 | Mathews | Nov. 23, 1886 |
| 978,988 | Cunningham | Dec. 20, 1910 |
| 1,278,841 | Brano | Sept. 17, 1918 |
| 1,368,270 | Lissman | Feb. 15, 1921 |
| 1,577,235 | Hucks | Mar. 16, 1926 |
| 1,710,233 | Mason et al. | Apr. 23, 1929 |
| 1,720,096 | Schofield | July 9, 1929 |
| 1,853,493 | Bell | Apr. 12, 1932 |
| 1,996,044 | Green | Mar. 26, 1935 |